US005968656A

United States Patent [19]

Ezenyilimba et al.

[11] Patent Number: 5,968,656

[45] **Date of Patent: *Oct. 19, 1999**

[54] ELECTROSTATOGRAPHIC INTERMEDIATE TRANSFER MEMBER HAVING A CERAMER-CONTAINING SURFACE LAYER

[75] Inventors: Matthew C. Ezenyilimba, Walworth; John C. Wilson, Rochester; William B. Vreeland, Webster, all of N.Y.

[73] Assignee: Eastman Kodak Company, Rochester, N.Y.

[ * ] Notice: This patent is subject to a terminal disclaimer.

[21] Appl. No.: 08/846,056

[22] Filed: Apr. 25, 1997

[51] Int. Cl.$^{6}$ .......................... B32B 27/00; G03G 13/01

[52] U.S. Cl. .......................... 428/423.1; 430/47; 399/297; 399/306

[58] Field of Search .......................... 428/423.1; 430/47; 399/297, 306

[56] References Cited

U.S. PATENT DOCUMENTS

| | | | |
|---|---|---|---|
| 5,084,735 | 1/1992 | Rimai et al. | 355/271 |
| 5,212,032 | 5/1993 | Wilson et al. | 430/65 |
| 5,337,129 | 8/1994 | Badesha | 355/275 |
| 5,456,987 | 10/1995 | Badesha | 428/421 |
| 5,480,938 | 1/1996 | Badesha et al. | 525/104 |
| 5,728,496 | 3/1998 | Rimai et al. | 430/47 |

OTHER PUBLICATIONS

Chemical Abstracts Service, Change in Indexing Policy for Siloxanes (Jan. 1995).

*Primary Examiner*—Mark Chapman
*Attorney, Agent, or Firm*—J. Richard Everett; J. Lanny Tucker

[57] ABSTRACT

In accordance with the present invention, an intermediate toner transfer member includes a substrate and an outer surface layer that includes a ceramer comprising a polyurethane silicate hybrid organic-inorganic network. The ceramer is formed by a crosslinking reaction between a polyurethane with reactive alkoxysilane terminal moieties and a tetraalkoxysilane. The silane-terminated polyurethane is the reaction product of one or more aliphatic polyols with terminal hydroxyl groups and an alkoxysilane-substituted alkyl isocyanate compound. Further in accordance with the present invention is a process for forming an intermediate toner transfer member having an outer surface layer comprising a polyurethane silicate hybrid organic-inorganic network.

42 Claims, No Drawings

ELECTROSTATOGRAPHIC INTERMEDIATE TRANSFER MEMBER HAVING A CERAMER-CONTAINING SURFACE LAYER

CROSS-REFERENCE TO RELATED APPLICATION

Reference, now U.S. Ser. No. 08/845,300, filed Apr. 25, 1997 is made to concurrently filed, commonly assigned application TRANSFER MEMBER FOR ELECTROSTATOGRAPHY, by W. Vreeland et al., the disclosure of which is incorporated herein by reference.

FIELD OF THE INVENTION

This invention relates to transfer members used in electrostatography and, more particularly, to an intermediate toner transfer member useful in the formation of color electrographic images and having a ceramer-containing surface layer.

BACKGROUND OF THE INVENTION

The use of intermediate toner transfer members in electrostatography has been suggested for several reasons, including simplified receiver sheet handling, single pass duplexing, reduced wear of photoconductors, and superposition of multiple images to form multicolor images. Typically, a toner image is created on a photoconductive member electrostatographically and is transferred by conventional, electric field assisted processes to an intermediate roller or web. For example, a negatively charged toner image is transferred from a photoconductor having a grounded backing electrode to an intermediate web or roller biased to a strong positive polarity. The toner image is then transferred from the intermediate member to a receiver sheet under the influence of a second electric field that can be created without changing the field on the intermediate member by placing a roller or a corona behind the receiver sheet that is biased still more strongly in a positive direction.

Of the reasons mentioned above for the use of intermediate toner transfer members, probably the most important use relates to the formation of multicolor images. For this application, two, three, or four separate images of different color can be transferred in registration to the intermediate transfer member to form a multicolor image that can then be transferred in one step to a receiver sheet. This method has several advantages over the approach in which the receiver sheet is secured to the periphery of a roller and rotated repeatedly into transfer relation with the photoconductor to receive the separate color images directly. Probably the most important advantage is that the receiver sheet itself does not have to be attached to a roller, which is a source of image misregistration and apparatus complexity. Other advantages associated with wear and tear on the photoconductive element and a direct receiver sheet path are also important.

As color electrostatography, especially electrographic color printing, continues to improve, increasingly higher image resolution will be required. In order to obtain high resolution, toners of fine particle size are necessary. Toners with particle size less than 20$\mu$, and especially those less than 10$\mu$ in size, give substantially improved resolution in color imaging with high quality equipment.

Unfortunately, fine particle toners are more difficult to transfer electrostatically than more traditional coarse toners. This is a problem in conventional electrostatography utilizing a single transfer of fine toner particles. It is a substantially more difficult problem using an intermediate transfer member in color electrostatography, which entails two transfers each of a plurality of different color images.

An intermediate toner transfer member typically includes a substrate on which is formed a relatively thick, resilient blanket and a relatively thin, hard outer layer on the blanket. The blanket, which may be integral with the substrate, is formed from a compliant polymeric material, frequently a polyurethane, that facilitates contact of the toner particles with the member during the transfer process. The blanket may be electrically modified to enhance the electrostatic attraction of the toner particles. Because compliant materials such as polyurethanes do not release toner very well, a relatively thin, hard surface layer is applied over the blanket layer.

Several properties of the intermediate transfer member surface are especially important. First, the surface energy must be sufficiently low to facilitate release of the fine toner particles, whose diameter may be on the order of 3–4$\mu$. In addition, the intermediate member surface must have good wear properties against the highly abrasive conditions of the transfer process. During transfer, pressure is exerted on the particles of toner and, optionally, carrier at the first nip formed by the photoconductor and intermediate transfer member. Even higher pressure is typically exerted at the second nip, where the receiver, most often paper, is brought into contact with the toner on the intermediate transfer member surface. Residual toner is removed at a cleaning station that may include a blade, a fur brush, or a magnetic brush.

The material comprising the transfer member surface must also have sufficient flexibility to prevent cracking during the transfer process just described. The hardness of the substrate and blanket upon which the overcoat is applied can vary over a considerable range, so it is necessary to adjust the flexibility of the overcoat appropriately. Finally, the intermediate transfer member surface layer must be sufficiently thin to prevent its acting as an insulator against the development of the field necessary for electrostatic attraction of the toner particles. It must also not counteract the compliant properties of the material constituting the blanket of the transfer member.

In summary, it is very important to control the surface energy, wear, and flexibility properties of the transfer member surface layer. These properties can be evaluated by, respectively, contact angle measurements, abrasion test measurements, and storage modulus determinations.

U.S. Pat. No. 5,084,735, the disclosure of which is incorporated herein by reference, describes an intermediate transfer member whose thin, relatively hard outer skin has a Young's modulus greater than $5\times10^7$ newtons/m$^2$.

U.S. Pat. No. 5,337,129 discloses an intermediate toner transfer component having a substrate coated with a composition comprising integrated, interpenetrating networks of haloelastomer, preferably fluoroelastomer, and silicon oxide and, optionally, polyorganosiloxane.

U.S. Pat. No. 5,480,938 describes a low surface energy material comprising an elastomer composition that is a substantially uniform integral interpenetrating network of a hybrid graft composition of a fluoroelastomer and a polyorganosiloxane.

An intermediate transfer member having a blanket member overcoated with a thin layer of a thermoplastic, a sol-gel, or, preferably, a ceramer is described in co-pending, commonly assigned U.S. application Ser. No. 08/653,518, filed May 24, 1996, by Rimai et al., ELECTROSTATOGRAPHIC APPARATUS AND METHOD FOR IMPROVED TRANSFER OF SMALL PARTICLES, the disclosure of which is incorporated herein by reference, now U.S. Pat. No. 5,728,496.

There is a continuing need for an electophotographic intermediate toner transfer member whose surface exhibits superior properties of wear, surface energy, and flexibility. The present invention meets this need.

SUMMARY OF THE INVENTION

In accordance with the present invention, an intermediate toner transfer member for electrostatography includes a substrate and an outer surface layer that includes a ceramer comprising a polyurethane silicate hybrid organic-inorganic network. The ceramer is formed by a crosslinking reaction between a polyurethane having reactive alkoxysilane terminal moieties and a tetraalkoxysilane. The alkoxysilane-terminated polyurethane is the reaction product of one or more aliphatic polyols containing terminal hydroxyl groups with an alkoxysilane-substituted alkyl isocyanate compound.

Further in accordance with the present invention is a process for forming an intermediate toner transfer member having an outer surface layer comprising a polyurethane silicate hybrid organic-inorganic network.

The intermediate toner transfer member of the invention having a surface layer of a polyurethane silicate ceramer exhibits excellent flexibility and toner release as well as high resistance to wear.

DETAILED DESCRIPTION OF THE INVENTION

The term "ceramer" is formed by merging the words "ceramic" and "polymer." Ceramers have been accepted by Chemical Abstracts Service (CAS) for monomer-based polymer registration (June 1994, Vol. 121). Ceramers are described in CAS *Change in Indexing Policy for Siloxanes* (January 1995) as "hybrid organic-inorganic networks prepared by hydrolytic polymerization (sol-gel process) of tetraalkoxysilanes with alkoxysilane-containing organic moieties, which may be trialkoxysilyl-terminated organic polymers." In the present invention, this description is applicable to the ceramers comprising the surface layer of the intermediate transfer member, wherein the alkoxysilane comprises an alkoxysilyl-terminated polyurethane.

In accordance with the present invention, an intermediate transfer member for electrostatography comprises a substrate and an outer surface layer comprising a ceramer that is a polyurethane silicate hybrid organic-inorganic network. The substrate is preferably a roller formed of a thermoplastic polyurethane, and the ceramer of the outer surface layer preferably comprises the reaction product of a polyurethane having terminal reactive alkoxysilane moieties with a tetrasiloxysilane compound.

In a more preferred embodiment, the polyurethane with terminal alkoxysilane groups is the reaction product of one or more aliphatic polyols having terminal hydroxyl groups and an alkoxysilane-substituted alkyl isocyanate compound. Suitable aliphatic polyols have molecular weights of about 60 to 8000 and may be polymeric. Polymeric aliphatic polyols may further include a plurality of functional moieties selected from the group consisting of an ester, an ether, a urethane, a non-terminal hydroxyl, and combinations thereof. Polymeric polyols containing ether functions are preferably polytetramethylene glycols having number-average molecular weights from about 200 to 6500, which can be obtained from various commercial source. For example, Terathane™ −2900, −2000, −1000, and −650 polytetramethylene glycols having the indicated number-average molecular weights are available from DuPont.

Polymeric polyols containing a plurality of urethane and ether groups are obtained by reaction of polyethylene glycols with alkylene diisocyanate compounds containing about 4 to 16 aliphatic carbon atoms, for example, 1,4-diisocyanatobutane, 1,6-diisocyanatohexane, 1,12-diisocyanatododecane, and, preferably, isophorone diisocyanate (5-isocyanato-1-(isocyanatomethyl)-1,3,3-trimethylcyclohexane). The reaction mixture may further include monomeric diols and triols containing 3 to about 16 carbon atoms; the triol compounds provide non-terminal hydroxyl substituents that provide crosslinking of the polyurethane. In a preferred embodiment of the invention, a polymeric polyol is formed from a mixture of isophorone diisocyanate, a polytetramethylene glycol having a number-average molecular weight of about 2900, 1,4-butanediol, and trimethylolpropane in a molar ratio of about 8:3:5:1.

Reaction of the aliphatic, preferably polymeric, polyol having terminal hydroxyl groups with an alkoxysilane-substituted alkyl isocyanate compound, which may be promoted by a condensation catalyst, for example, an organotin compound such as dibutyltin dilaurate, provides a polyurethane having terminal reactive alkoxysilane moieties, which undergoes further reaction, preferably acid-catalyzed, with a tetraalkoxysilane compound to provide a ceramer useful for the surface layer of the transfer member of the present invention. The molar ratio of aliphatic polyol:alkoxysilane-substituted alkyl isocyanate is preferably about 4:1 to about 1:4, more preferably about 2:1 to about 1:2.

The aliphatic hydroxyl-terminated polyols employed in the preparation of the ceramer of the invention are of the general formula $$HO—R^1—OH$$

and have molecular weights of about 60 to 8000. As previously noted, at least one polyol is preferably polymeric, and $R^1$ may include a plurality of ester, ether, urethane, and non-terminal hydroxyl groups.

The alkoxysilane-substituted alkyl isocyanate compound preferably has the formula $$OCN—R^2—Si(OR^3)Z^1Z^2$$

where $R^2$ is an alkylene group containing about 2 to 8 carbon atoms, $OR^3$ is an alkoxy group containing 1 to about 6 carbon atoms, and $Z^1$ and $Z^2$ are moieties independently selected from the group consisting of alkoxy containing 1 to about 6 carbon atoms, hydrogen, halo, and hydroxy. More preferably, $R^2$ contains 2 to about 4 carbon atoms, and $OR^3$, $Z^1$, and $Z^2$ are each alkoxy groups containing 1 to about 4 carbon atoms. An especially preferred alkoxysilane-substituted alkyl isocyanate compound is 3-isocyanatopropyl-triethoxysilane.

The tetraalkoxysilane compound is preferably selected from the group consisting of tetrabutyl orthosilicate, tetrapropyl orthosilicate, and, more preferably, tetraethyl orthosilicate.

The hybrid organic-inorganic network of the ceramer comprising the outer surface layer of the intermediate transfer member of the invention has the general structure

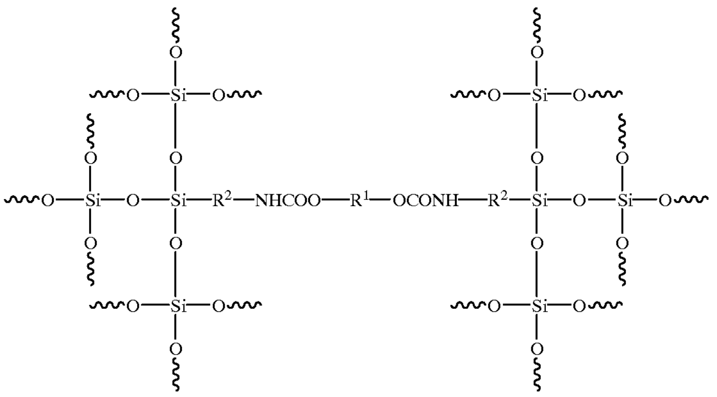

where $R^1$ and $R^2$ are as previously defined. The hybrid organic-inorganic network includes about 10 to 80 weight percent, more preferably about 25 to 65 weight percent, and most preferably about 35 to 50 weight percent silicon oxide. The outer surface layer has a thickness of about 1μ to 20μ, preferably about 2μ to 12μ. Its measured storage modulus is about 0.10 GPa to 2.0 GPa, more preferably about 0.30 GPa to 1.75 GPa, and most preferably about 1.0 GPa to 1.5 GPa.

The intermediate transfer member of the invention comprises a substrate that is preferably a polyurethane roller. Such rollers can be made from various commercially available polyurethane two-component mixes such as, for example, Conathane™ TU-400, TU-500, and TU-900, from Conap Inc., Olean N.Y. They can also be prepared from various combinations of prepolymer resins such as Adiprene™ L100 and L42, and Vibrathane™ 8011, all available from Uniroyal; chain-extending agents such as Ethacure™ 100 and 300, from Ethyl Corporation; and crosslinking agents such as Voranol™ 234-630, from Dow Chemical, and LHT-28, from Arco Chemical. The preparation of transfer rollers containing antistatic agents is described in U.S. Pat. 5,212,032, the disclosure of which is incorporated herein by reference.

The following examples further illustrate the invention:

Ceramer Preparation

EXAMPLE 1

To a one-liter, three-neck round bottom flask containing 300 g dry tetrahydrofuran (THF) under nitrogen was added 100.0 g (0.0345 mole) Terathane™ 2900 polytetramethylene glycol, 4.94 g (0.0549 mole) 1,4-butanediol, and 1.52 g (0.0113 mole) trimethylolpropane. The mixture was stirred under nitrogen until a solution was obtained; then 19.72 g (0.0887 mole) isophorone diisocyanate was added, and the mixture was degassed under reduced pressure (0.10 mm Hg). 0.0127 g (0.0187 mmole) dibutyltin dilaurate was added, and the mixture was heated at 60° C. under nitrogen for 5.5 hr. To the above solution was added 9.93 g (0.0401 mole) 3-isocyanatopropyl-triethoxysilane and 130.0 g dry THF. The mixture was heated at 60° C. for 15 hr, yielding a solution containing 24.0 weight percent dissolved solids.

To 64.7 ml of the above solution in a 500-ml plastic beaker was added 60 ml isopropyl alcohol and 51.4 ml (0.250 mole) tetraethyl orthosilicate. After stirring of the resulting solution at room temperature for several minutes, 18 ml of 0.15N hydrochloric acid was added. The solution was stirred at room temperature for 48 hr, after which 0.5 g Silwet™ 7002 was added. The resulting solution was stirred for 15 min, then allowed to stand for 15 min longer before coating as described in Examples 13-14.

EXAMPLE 2

To a one-liter, three-neck round bottom flask containing 700 g dry THF under nitrogen was added 250.0 g (0.0862 mole) Terathane™ 2900 polytetramethylene glycol, 12.35 g (0.1370 mole) 1,4-butanediol, and 3.80 g (0.0283 mole) trimethylolpropane. The mixture was stirred under nitrogen until a solution was obtained; then 49.30 g (0.222 mole) isophorone diisocyanate was added, and the mixture was degassed under reduced pressure (0.10 mm Hg). 0.0295 g (0.0467 mmole) dibutyltin dilaurate was added, and the mixture was heated at 60° C. under nitrogen for 5.5 hr. To the above solution was added 24.83 g (0.1004 mole) 3-isocyanatopropyl-triethoxysilane and 208.4 g dry THF. The mixture was heated at 60° C. for 16 hr.

To 32.0 ml of the above solution in a 500-ml plastic beaker was added 34.1 ml isopropyl alcohol and 29.27 ml (0.142 mole) tetraethyl orthosilicate. After stirring the resulting solution at room temperature for several minutes, 10.24 ml of 0.15N hydrochloric acid was added. The solution was stirred at room temperature for 48 hr, after which was added 0.23 g Silwet™ 7002. The mixture was stirred for 15 min, then allowed to stand for 15 min longer before coating as described in Examples 13–14.

EXAMPLE 3

To a one-liter, three-neck round bottom flask containing 637 grams dry THF under nitrogen was added 170.09 g (0.0587 mole) Terathane™ 2900 polytetramethylene glycol, 6.35 g (0.0.0705 mole) 1,4-butanediol, and 5.65 g (0.0421 mole) trimethylolpropane. The mixture was stirred under nitrogen until a solution was obtained; then 33.60 g (0.151 mole) isophorone diisocyanate was added, and the mixture was degassed under reduced pressure (0.10 mm Hg). 0.0201 g (0.0318 mmole) dibutyltin dilaurate was added, and the mixture was heated at 60° C. under nitrogen for 5.5 hr. To the above solution was added 21.50 g (0.086 mole) 3-isocyanatopropyl-triethoxysilane and 100 g dry THF. The mixture was heated at 60° C. for 15.5 hr, yielding a solution containing 24.4 weight percent dissolved solids.

To 59.7 ml of the above solution in a 500-ml plastic beaker was added 60 ml of isopropyl alcohol and 51.4 ml (0.250 mole) tetraethyl orthosilicate. After stirring of the resulting solution at room temperature for several minutes, 18 ml of 0.15N hydrochloric acid was added. The resulting solution was stirred at room temperature for 48 hr, after which 0.4 g Silwet™ 7002 was added. The solution was stirred for 15 min, then allowed to stand for 15 min longer before coating as described in Examples 13-14.

EXAMPLE 4

To a one-liter three-neck round bottom flask containing 1500 g dry THF under nitrogen was added 500 g (0.1724 mole) Terathane™ 2900 polytetramethylene glycol, 24.70 g (0.274 mole) 1,4-butanediol, and 7.60 g (0.0566 mole) trimethylolpropane. The mixture was stirred under nitrogen until a solution was obtained; then 98.60 g (0.444 mole) isophorone diisocyanate was added, and the mixture was degassed under reduced pressure (0.10 mm Hg). 0.0584 g (0.0925 mmole) dibutyltin dilaurate was added, and the mixture was heated at 60° C. under nitrogen for 5.5 hr. To the above solution was added 49.60 g (0.201 mole) 3-isocyanatopropyl-triethoxysilane and 543.68 g dry THF. The mixture was heated at 60° C. for 15 hr.

To 78.91 ml of the above solution in a 500-ml plastic beaker was added 60 ml isopropyl alcohol and 51.4 ml (0.250 mole) tetraethyl orthosilicate. After stirring of the resulting solution at room temperature for several minutes, 18 ml of 0.15N hydrochloric acid was added. The resulting solution was stirred at room temperature for 48 hr, after which 0.49 g Silwet™ 7002 was added. The mixture was stirred for 15 min, then allowed to stand for 15 min longer before coating as described in Examples 13-14.

EXAMPLE 5

To a one-liter, three-neck round bottom flask containing 285.7 grams dry THF under nitrogen was added 100.0 g (0.154 mole) Terathane™ 650 polytetramethylene glycol, 80.10 g (0.324 mole) 3-isocyanatopropyl-triethoxysilane, and 0.103 g (0.163 mmole) dibutyltin dilaurate. The mixture was heated at 60° C. for 16 hr, yielding a solution containing 63.0 weight percent dissolved solids.

To 6.93 ml of the above solution in a 4-dram vial was added 5.35 ml (0.026 mole) of tetraethyl orthosilicate and 7.5 ml isopropanol. Then 1.75 ml of 0.15N hydrochloric acid was added, and the mixture was stirred at room temperature for 2 hr, becoming a clear solution during this time. To this solution was added 0.042 g Silwet™ 7002. The resulting solution was coated on a Teflon™ sheet. The coating was allowed to stand at room temperature overnight, then cured at 80° C. for 24 hr.

EXAMPLE 6

To a one-liter, three-neck round bottom flask containing 305.8 g dry THF under nitrogen was added 153.80 g (0.154 mole) Terathane™ 1000 polytetramethylene glycol, 80.10 g (0.324 mole) 3-isocyanatopropyl-triethoxysilane, and 0.133 g (0.21 mmole) dibutyltin dilaurate. The mixture was heated at 60° C. for 16 hr, yielding a solution containing 43.4 weight percent dissolved solids.

To 7.72 ml of the above solution in a 4-dram vial was added 5.35 ml (0.026 mole) tetraethyl orthosilicate and 7.5 ml isopropanol. Then 1.75 ml of 0.15N hydrochloric acid was added, and the resulting solution was stirred at room temperature for 2 hr. Following addition of 0.042 g Silwet™ 7002, the solution was coated on a Teflon™ sheet. The coating was allowed to stand at room temperature overnight, then cured at 80° for 24 hr.

EXAMPLE 7

To a one-liter, three-neck round bottom flask containing 290.29 g dry THF under nitrogen was added 150 g (0.075 mole) Terathane™ 2000 polytetramethylene glycol, 39.06 g (0.158 mole) 3-isocyanatopropyl-triethoxysilane, and 0.049 g (0.077 mmole) dibutyltin dilaurate. The mixture was heated at 60° C. for 16 hr, yielding a solution containing 39.4 weight percent dissolved solids.

To 5.08 ml of the above solution in a 4-dram vial was added 5.35 ml (0.026 mole) tetraethyl orthosilicate and 2.5 ml isopropanol. Then 1.75 ml of 0.15N hydrochloric acid was added, and the solution was stirred at room temperature for 2 hr. Following addition of 0.042 g Silwet™ 7002, the solution was coated on a Teflon™ sheet. The coating was allowed to stand at room temperature overnight, then cured at 80° C. for 24 hr.

EXAMPLE 8

To a one-liter, three-neck round bottom flask containing 349.3 g dry THF under nitrogen was added 150.0 g (0.052 mole) Terathane™ 2900 polytetramethylene glycol, 26.94 g (0.109 mole) 3-isocyanatopropyl-triethoxysilane, and 0.032 g (0.050 mmole) dibutyltin dilaurate. The mixture was heated at 60° C. for 16 hr, yielding a solution containing 33.6 weight percent dissolved solids.

To 6.57 ml of the above solution in a 4-dram vial was added 5.35 ml (0.026 mole) tetraethyl orthosilicate and 7.5 ml isopropanol. Then 1.75 ml of 0.15N hydrochloric acid was added, and the solution was stirred at room temperature for 2 hr. Following addition of 0.042 g Silwet™ 7002, the solution was coated on a Teflon™ sheet. The coating was allowed to stand at room temperature overnight, then cured at 80° C. for 24 hr.

EXAMPLE 9

To a 250-ml, three-neck round bottom flask equipped with a mechanical stirrer, condenser, thermometer, and nitrogen purge and containing 18.37 g (12.67 meq) Terathane™ 2900 polytetramethylene glycol, 0.91 g (20.19 meq) 1,4-butanediol (Aldrich), and 0.28 g (6.26 meq) trimethylolpropane (Aldrich) was added 112.5 ml dry THF. The mixture was stirred at room temperature until solution occurred. To the resulting solution was added a second solution of 3.62 g (33.23 meq) isophorone dilsocyanate (Aldrich) and 25 ml dry THF dropwise from an addition funnel. Ten drops of dibutyltin dilaurate (Aldrich) was added to the reaction mixture, which was then heated under nitrogen at 60° C. for 5.5 hr.

A solution of 1.82 g (7.35 meq) 3-isocyanatopropyl-triethoxysilane in 25 ml dry THF was added dropwise from an addition funnel to the reaction mixture over about 10 min. The resulting mixture was heated at 60° C. for 16 hr, then cooled to room temperature. A 5-ml sample was removed for SEC analysis. The reaction mixture was stirred at room temperature for 24 hr, at which point it was assumed to contain approximately 14.3% solids. A solution of 48.5 ml isopropanol and 38.78 g (744.58 meq) tetraethyl orthosilicate was added to the mixture dropwise from an addition funnel over a 7-minute period. The resulting mixture was stirred at room temperature for 60 hr.

A coating was prepared by pouring 2 ml of the reaction solution on a Teflon™ sheet and spreading with a 0.032-in (8-mm) coating knife. The coating was dried at room temperature for 1 to 2 hr, then placed in an oven that was ramped over a period of 1 hr to 80° C. and held at that temperature for 24 hr. The resulting sample was submitted for dynamic mechanical analysis (DMA) and thermogravimetric analysis (TGA).

A second coating was prepared by pouring 3 ml of coating solution on an Estar™ sheet and spreading with a 0.004-in (1-mm) coating knife. Curing was carried out under the same conditions as were used for the first coating. The second sample was submitted for abrasion wear testing and surface energy analysis.

24 hr later, a third coating was prepared on an Estar™ sheet from about 5 ml of the reaction solution, using the 0.004-in (1-mm) coating knife. This coating was cured in the same way as the first two coatings. This third sample was submitted for abrasion wear testing and surface energy analysis.

EXAMPLE 10

To a 500-ml, three-neck round bottom flask equipped with a mechanical stirrer, condenser, thermometer, and nitrogen purge, and containing 18.37 g (12.67 meq) Terathane™ 2900 polytetramethylene glycol, 0.91 g (20.19 meq) 1,4-butanediol (Aldrich), and 0.28 g (6.26 meq) trimethylolpropane (Aldrich) was added 112.5 ml dry THF. The mixture was stirred at room temperature until solution was attained. To the resulting solution was added 3.63 g (33.23 meq) isophorone diisocyanate (Aldrich) dropwise from an addition funnel. Six drops of dibutyltin dilaurate (Aldrich) was added to the reaction mixture, which was then heated under nitrogen at 60° C. for 3 hr. Based on IR analysis, reaction was complete at this point. The mixture was stirred at room temperature for two hours. A solution of 25 ml dry THF and 1.82 g (7.35 meq) 3-isocyanatopropyl-triethoxysilane was then added dropwise from an addition funnel to the reaction over a 10-min period. The resulting mixture was heated at 60° C. for 16 hr, then cooled to room temperature. A sample was removed and submitted for IR and SEC.

A solution of 53 ml isopropanol and 42.30 g (812.16 meq) tetraethyl orthosilicate was added to the reaction mixture dropwise, with stirring, from an addition funnel over a 6-min period. Then 15.8 ml of 0.15N HCl was added, and stirring at room temperature was continued for 48 hr.

Two coatings were prepared from 15 ml reaction solution to which 0.30 g Silwet™ 7002 had been added, as follows: 12 ml of this solution was poured on a Teflon™ sheet and spread with a 0.032-in (8-mm) coating knife. The coating was air dried at room temperature for 1 to 2 hr, then placed in an oven that was ramped over 1 hr to 80° C. The coating was held at this temperature for 24 hr. The resulting sample was submitted for DMA and TGA.

A second coating was prepared on an Estar™ sheet from the remaining 3 ml of coating solution, using a 0.004-in (8-mm) coating knife. Curing conditions were the same as those used for the first coating. The second sample was submitted for abrasion wear testing and surface energy analysis.

EXAMPLE 11

To a 250-ml, three-neck round bottom flask equipped with a magnetic stirrer, condenser, thermometer, and nitrogen purge, and containing 18.39 g (12.67 meq) Terathane™ 2900 polytetramethylene glycol, 0.91 g (20.19 meq) 1,4-butanediol (Aldrich), and 0.28 g (6.26 meq) trimethylolpropane (Aldrich) was added 50 ml dry THF. The mixture was stirred for 10 min at room temperature until solution was obtained. To the resulting solution was added 3.64 g (33.42 meq) isophorone diisocyanate (Aldrich) all at once from a graduated cylinder, which was rinsed with 12 ml dry THF that was also added to the mixture. Two drops of dibutyltin dilaurate (Aldrich) was added to the reaction mixture, which was heated at 60° C. under nitrogen for 2 hr. The course of the reaction was monitored by infrared spectroscopy and found to be incomplete at this point, a small isocyanate peak being detected at 2270 $cm^{-1}$.

1.82 g (7.35 meq) 3-isocyanatopropyl-triethoxysilane was added all at once to the reaction mixture from a graduated cylinder, which was rinsed with 25 ml dry THF that was also added to the mixture. The reaction mixture was heated at 60° C. for 2 hr. IR analysis at this point indicated that reaction was substantially complete, the isocyanate peak at 2270 $cm^{-1}$ being very small.

The reaction mixture was cooled to room temperature, and 57.45 g (1103 meq) tetraethyl orthosilicate was added all at once, followed by 56 ml isopropanol. The mixture was stirred for 2 min; then 17 ml of 0.15 N HCl was added, and the resulting mixture was stirred at room temperature for 16 hr.

15 ml of the reaction solution was mixed with two drops of Silwet™ 7002, and air was removed from the mixture under vacuum. A coating prepared by pouring 12 ml of this solution onto a Teflon™ sheet was allowed to air dry for 1 hr, then placed in an oven that was ramped over 1 hr to 80° C. The coating was held at this condition for 24 hr, and the resulting sample was submitted for DMA and TGA.

24 hr later, a second coating solution was prepared by the same procedure as previously described and used to prepare a second sample, which was submitted for DMA and TGA.

Six days later, a third coating solution was prepared similarly to the first two solutions. This third solution was coated on an Estar™ sheet by spreading with a 0.004-in (8-mm) knife. The coating was air dried for 1 hr at room temperature, then placed in an oven that was ramped over a 1-hr period to 80° C. The coating was held at this condition for 24 hr, then submitted for surface energy analysis and abrasion wear testing.

Transfer Roller Substrate Preparation

EXAMPLE 12

To a 4-liter resin kettle containing 17.48 g ($1\times10^{-5}$ mole) of the ferric chloride-diethylene glycol conductivity control agent prepared by the procedure described in Example 1 of the previously cited U.S. Pat. No. 5,212,032 was added 553.3 g polypropylene glycol, $M_n$ 2000, from Dow Chemical Co. The mixture was stirred until homogeneous; then 0.1 g SAG-47 surfactant was added, followed by 2909 g of L42 polyurethane prepolymer from Uniroyal that had been heated to 60° C. The mixture was stirred until homogeneous, and 120.47 (0.562 mole) Ethacure™ 300 diamine chain extender from Ethyl Corporation was added. The resulting mixture was stirred for 5 min under nitrogen, then degassed under reduced pressure and poured into a cylindrical mold. The obtained cylindrical roller having an outside diameter of 181.9 mm was cured in an oven at 80° C. for 18 hr. The cured roller had a 65 Shore A hardness and a volume resistivity of $1.2\times10^{8}$ ohm-cm.

Transfer Roller Preparation

EXAMPLE 13

The solutions of ceramers prepared as described in Examples 1–4 were ring-coated on polyurethane roller substrates prepared as described in Example 12. The coated roller substrates were allowed to air dry for 1.5 hr, then cured in an oven that was ramped to 80° C. over 1 hr and then held at 80° C. for 24 hr. The ceramer outer surface layers on the rollers had a thickness of about 10$\mu$.

Ceramer Layer Measurements

EXAMPLE 14

The ceramer solutions of Examples 1–11 were each hand-coated on an Estar™ sheet. The coated sheets were allowed to air dry for 1.5 hr, then cured in an oven that was ramped to 80° C. over 1 hr, and held at 80° C. for 24 hr. These coatings were used for surface energy measurements and abrasion wear tests.

The solutions of ceramers prepared as described in Examples 1–11 were also each hand-coated on a Teflon™ sheet. The coatings were allowed to stand at room temperature overnight, then heated in an oven at 80° C. for 24 hr. These coatings were employed for TGA and DMA of the ceramers.

Dynamic mechanical analysis (DMA), which is described in, for example, Wunderlich, *Thermal Analysis*, Academic Press, San Diego Calif., 1990, pp 350–361, was carried out on the coatings of the ceramers on Teflon™, using a Rheometrics Solids Analyzer RSAII over a temperature range of −150° C. to 200° C. After initial cooling to −150° C. with a dwell time at −150° C. of 0.1 min, the samples were run at a rate of 2° C./step to obtain the values of storage modulus for the coated ceramers. The results are included in TABLE 1 below. Glass transition temperature, $T_g$, values were also determined for the ceramers; all fell within the range from about −60° to −72° C., as shown by the $T_g$ data in TABLE 1.

Coatings of the ceramers on Teflon™ were also subjected to thermogravimetric analysis (TGA), which is described in, for example, Campbell et al., *Polymer Characterization: Physical Techniques*, Chapman and Hall, New York, 1989, pp 317-318. The analyses were carried out under nitrogen with a flow rate of 100 cc/min on samples at a heating rate of 10° C./min over the range 25–800° C. Weight losses at 150° C. were measured, and the residues remaining at 800° C. at the conclusion of the runs were weighed to determine the inorganic content of the ceramers. These results are recorded as weight percent $SiO_2$ in TABLE 1.

Surface energy measurements of the coatings of the ceramers on Estar™ were carried out using a Rame-Hart Model 100-00-115 Goniometer. Polar and dispersive forces were measured using, respectively, water and diiodomethane. In the absence of Silwet™ 7002 in the coating formulations, all the ceramers coating exhibited surface energies of approximately 50 dynes/$cm^2$. With Silwet™ present, the measured surface energies were substantially lower, generally in the 30–40 dynes/$cm^2$ range.

TABLE 1

| Ceramer Example | $SiO_2$ wt. % | Tg ° C. | Storage Modulus GPa, 25° C. | Wear μ (100 cycles) |
|---|---|---|---|---|
| 1 | 43 | −64.2 | 1.3 | 0 |
| 2 | 42 | | 1.0 | 0 |
| 3 | 44 | −65.9 | 1.4 | 0 |
| 4 | 39 | −60.2 | 1.5 | 0 |
| 5 | 45 | −64.1 | 1.2 | 0.067 |
| 6 | 39 | −71.9 | 0.35 | 0.357 |
| 7 | 48 | −68.1 | 0.70 | 0.556 |
| 8 | 41 | −66.1 | 0.40 | 0.150 |
| 9 | 29 | −71.5 | 0.41 | |
| 10 | 35 | −67.9 | 0.80 | |
| 11 | 39 | −71.3 | 0.89 | |

As shown by the test results assembled in TABLE 1, preferred embodiments of the ceramer compositions of the invention contain $SiO_2$ concentrations of about 35 to 50 weight percent. However, ceramers containing $SiO_2$ in the range of about 10 to 80 weight percent are also useful for forming the outer surface layer of an intermediate transfer member.

Also as shown in TABLE 1, preferred ceramer compositions have storage modulus values of about 0.3 GPa to 1.5 GPa at 25° C., with especially preferred compositions (Examples 1–5) having values of 1.0 GPa to 1.5 GPa at 25° C. However, ceramer compositions with storage modulus values of about 0.1 GPa to 2.0 GPa are useful in the practice of the invention.

Abrasion Wear Tests

EXAMPLE 15

A seamless transfer belt was coated with a blanket layer of the polyurethane composition described for the roller substrate in Example 12. Coatings of ceramers of Examples 1–8 of the invention were applied to portions of the belt and cured as described in Example 12. The ceramer-containing surface layers had thicknesses of about 10–15μ.

A 1×1-in (2.5×2.5-cm) sample of each of the cured coatings was placed on a platen, and a 0.5-in (1.25-cm)-wide strip of paper supplied from a spool was drawn across the surface of the coating sample under a controlled force intermittently exerted by engagement and disengagement of a 1-in (2.5-cm)-long roller with the surface. The rubbing of the paper strip against the ceramer surface layer was carried out for 100 cycles, and the loss of thickness of the surface layer by abrasion was measured. The results of this wear test are included in TABLE 1 above.

As the entries in the Wear column of TABLE 1 show, ceramers of Examples 6–8 exhibited a moderate to high degree of wear (0.150–0.556μ thickness loss), and that of Example 5 exhibited only a slight amount of wear (0.067μ loss). The ceramers of Examples 1–4, however, displayed outstanding durability, with no measurable loss in the thickness of the ceramer-containing surface layer.

EXAMPLE 16

To one half of a polyurethane intermediate transfer roller substrate prepared as described in Example 12 was applied a coating of the ceramer of Example 1, which was cured as described in Example 13. The thickness of the cured ceramer layer was about 10μ.

To the other half of the roller substrate was applied a layer of a thermoplastic polyurethane composition. A life test was carried out using this roller with a styrene-butyl acrylate toner composition in which the toner concentration was maintained between 9 and 11 percent and the charge-to-mass was held between 25 and 50 μQ/gram. The intermediate transfer roller was cleaned with a 78 Shore A polyurethane blade. The photoconductor was bias developed, and the toner was transferred first to the intermediate surface and thence to the receiver, Captain Copier A4 size paper (80 gm wt).

The test was 150K copies long, with an average daily volume of about 2K. Sampling of the ceramer and polyurethane overcoats was carried out every 30K; samples were bored out of each side of the coated roller in the paper path and examined by cross-section microscopy to determine overcoat thickness and by scanning electron microscopy to ascertain the surface topography.

As shown by the data in TABLE 2 below, the thermoplastic polyurethane layer wore at a steady rate of 1μ every 30K copies until 90K, at which time it appeared to undergo no appreciable further wear. Although the 150K copy test required several photoconductor drums, several cleaning blades, and a complete developer overhaul at 120K, the ceramer overcoat of the ceramer of Example 1 of the invention survived with no measurable decrease in overcoat layer thickness.

TABLE 2

| Overcoat | No. of Copies | Overcoat Thickness ($\mu$) |
|---|---|---|
| Urethane | 8K | 4.0 |
| | 30K | 4.0 |
| | 60K | 3.0 |
| | 90K | 2.0 |
| | 120K | 2.0 |
| | 150K | 2.0 |
| Ceramer | 8K | 10.0 |
| | 30K | 10.0 |
| | 60K | 10.0 |
| | 90K | 10.0 |
| | 120K | 10.0 |
| | 150K | 10.0 |

The invention has been described in detail with particular reference to preferred embodiments thereof, but it will be understood that variations and modifications can be effected within the spirit and scope of the invention.

What is claimed is:

1. An intermediate transfer member for electrostatography comprising:

a substrate; and an outer surface layer comprising a ceramer, said ceramer comprising a polyurethane silicate hybrid organic-inorganic network.

2. The intermediate transfer member of claim 1 wherein said ceramer comprises the reaction product of a polyurethane having terminal reactive alkoxysilane groups with a tetraalkoxysilane compound.

3. The intermediate transfer member of claim 2 wherein said polyurethane having terminal alkoxysilane groups comprises the reaction product of one or more aliphatic polyols having terminal hydroxyl groups and an alkoxysilane-substituted alkyl isocyanate compound.

4. The intermediate transfer member of claim 3 wherein said aliphatic polyols have molecular weights of about 60 to 8000.

5. The intermediate transfer member of claim 3 wherein at least one of said aliphatic polyols is a polymer.

6. The intermediate transfer member of claim 5 wherein said polymeric aliphatic polyol further includes a plurality of functional moieties selected from the group consisting of an ester, an ether, a urethane, a non-terminal hydroxyl, and combinations thereof.

7. The intermediate transfer member of claim 6 wherein said polymeric aliphatic polyol comprises a polytetramethylene glycol.

8. The intermediate transfer member of claim 7 wherein said polytetramethylene glycol has a number-average molecular weight of about 200 to 6500.

9. The intermediate transfer member of claim 6 wherein said polymeric aliphatic polyol comprises a reaction product of a mixture comprising a polytetramethylene glycol and an alkylene diisocyanate compound containing about 4 to 16 aliphatic carbon atoms.

10. The intermediate transfer member of claim 9 wherein said mixture further comprises a monomeric aliphatic diol and a monomeric aliphatic triol, each containing 3 to about 16 carbon atoms.

11. The intermediate transfer member of claim 10 wherein said polytetramethylene glycol has a number-average molecular weight of about 2900, said monomeric aliphatic diol is 1,4-butanediol, said monomeric aliphatic triol is trimethylolpropane, and said alkylene diisocyanate compound is isophorone diisocyanate.

12. The intermediate transfer member of claim 11 wherein the molar ratio of isophorone diisocyanate:polytetramethylene glycol:1,4-butanediol:trimethylolpropane is about 8:3:5:1.

13. The intermediate transfer member of claim 3 wherein the molar ratio of said aliphatic polyol:alkoxysilane-substituted alkyl isocyanate compound is about 4:1 to about 1:4.

14. The intermediate transfer member of claim 13 wherein the molar ratio of said aliphatic polyol:alkoxysilane-substituted alkyl isocyanate compound is about 2:1 to about 1:2.

15. The intermediate transfer member of claim 3 wherein said alkoxysilane-substituted alkyl isocyanate compound has the formula $$OCN—R^2—Si(OR^3)Z^1Z^2$$

wherein $R^2$ is an alkylene group containing 2 to about 8 carbon atoms, $OR^3$ is an alkoxy group containing 1 to about 6 carbon atoms, and $Z^1$ and $Z^2$ are moieties independently selected from the group consisting of alkoxy containing 1 to about 6 carbon atoms, hydrogen, halo, and hydroxyl.

16. The intermediate transfer member of claim 15 wherein $R^2$ is an alkylene group containing 2 to about 4 carbon atoms, and $OR^3$, $Z^1$, and $Z^2$ are each alkoxy groups containing 1 to about 4 carbon atoms.

17. The intermediate transfer member of claim 16 wherein said tetraalkoxysilane compound is selected from the group consisting of tetraethyl orthosilicate, tetrapropyl orthosilicate, and tetrabutyl orthosilicate.

18. The intermediate transfer member of claim 17 wherein said alkoxysilane-substituted alkyl isocyanate compound is 3-isocyanatopropyl-triethoxysilane and said tetraalkoxysilane compound is tetraethyl orthosilicate.

19. The intermediate transfer member of claim 1 wherein said ceramer has a silicon oxide network comprising about 10 to 80 weight percent of said ceramer.

20. The intermediate transfer member of claim 19 wherein said silicon oxide network comprises about 25 to 65 weight percent of said ceramer.

21. The intermediate transfer member of claim 20 wherein said silicon oxide network comprises about 35 to 50 weight percent of said ceramer.

22. The intermediate transfer member of claim 1 wherein said outer surface layer has a storage modulus of about 0.10 GPa to 2.0 GPa.

23. The intermediate transfer member of claim 22 wherein said outer surface layer has a storage modulus of about 0.30 GPa to 1.75 GPa.

24. The intermediate transfer member of claim 23 wherein said outer surface layer has a storage modulus of about 1.0 GPa to 1.5 GPa.

25. The intermediate transfer member of claim 1 wherein said outer surface layer has a thickness of about 1$\mu$ to 20$\mu$.

26. The intermediate transfer member of claim 25 wherein said outer surface layer has a thickness of about 2$\mu$ to 12$\mu$.

27. The intermediate transfer member of claim 1 wherein said substrate is a roller comprising a thermoplastic polyurethane.

28. A process for forming an intermediate transfer member for electrostatography, said process comprising:

applying to a substrate a liquid composition comprising a volatile organic solvent and a ceramer, said ceramer comprising a polyurethane silicate hybrid organic-inorganic network; and evaporating said solvent, thereby forming on said substrate an outer surface layer comprising said ceramer.

29. The process of claim 28 wherein said ceramer comprises the reaction product of a polyurethane having terminal reactive alkoxysilane groups with a tetraalkoxysilane compound.

30. The process of claim 29 wherein said polyurethane having terminal alkoxysilane groups comprises the reaction product of one or more aliphatic polyols having terminal hydroxyl groups and an alkoxysilane-substituted alkyl isocyanate compound.

31. The process of claim 30 wherein at least one of said aliphatic polyols is a polymer.

32. The process of claim 31 wherein said polymeric aliphatic polyol further includes a plurality of functional moieties selected from the group consisting of an ester, an ether, a urethane, a non-terminal hydroxyl, and combinations thereof.

33. The process of claim 32 wherein said polymeric aliphatic polyol comprises a reaction product of a mixture comprising a polytetramethylene glycol and an alkylene diisocyanate compound containing about 4 to 16 aliphatic carbon atoms.

34. The process of claim 33 wherein said polytetramethylene glycol has a number-average molecular weight of about 200 to 6500.

35. The process of claim 34 wherein said mixture further comprises a monomeric aliphatic diol and a monomeric aliphatic triol, each containing 3 to about 16 carbon atoms.

36. The process of claim 35 wherein said mixture comprises a polytetramethylene glycol having a number-average molecular weight of about 2900, 1,4-butanediol, trimethylolpropane, and isophorone diisocyanate.

37. The process of claim 30 wherein said alkoxysilane-substituted alkylisocyanate compound has the formula $$OCN—R^2—Si(OR^3)Z^1Z^2$$

wherein $R^2$ is an alkylene group containing 2 to about 8 carbon atoms, $OR^3$ is an alkoxy group containing 1 to about 6 carbon atoms, and $Z^1$ and $Z^2$ are moieties independently selected from the group consisting of alkoxy containing 1 to about 6 carbon atoms, hydrogen, halo, and hydroxyl.

38. The process of claim 37 wherein said alkoxysilane-substituted alkyl isocyanate compound is 3-isocyanatopropyl-triethoxy silane and said tetraalkoxysilane compound is tetraethyl orthosilicate.

39. The process of claim 28 wherein said ceramer has a silicon oxide network comprising about 10 to 80 weight percent of said ceramer.

40. The process of claim 28 wherein said outer surface layer has a storage modulus of about 0.1 GPa to 2.0 GPa.

41. The process of claim 28 wherein said outer surface layer has a thickness of about 1$\mu$ to 20$\mu$.

42. The process of claim 28 wherein said substrate is a roller comprising a thermoplastic polyurethane.

* * * * *